(12) United States Patent
AlYousif et al.

(10) Patent No.: US 11,814,577 B2
(45) Date of Patent: Nov. 14, 2023

(54) ENHANCING FOAM RHEOLOGICAL PROPERTIES USING WATER-SOLUBLE THICKENER

(71) Applicant: SAUDI ARABIAN OIL COMPANY, Dhahran (SA)

(72) Inventors: Zuhair AlYousif, Saihat (SA); Mohammed Alabbad, Dammam (SA); Hana Almatouq, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/456,755

(22) Filed: Nov. 29, 2021

(65) Prior Publication Data

US 2022/0081608 A1 Mar. 17, 2022

Related U.S. Application Data (62) Division of application No. 15/931,000, filed on May 13, 2020, now abandoned.

(51) Int. Cl.
*C09K 8/594* (2006.01)
*C09K 8/584* (2006.01)
*C09K 8/86* (2006.01)
*E21B 43/16* (2006.01)

(52) U.S. Cl.
CPC .............. *C09K 8/584* (2013.01); *C09K 8/594* (2013.01); *C09K 8/86* (2013.01); *E21B 43/166* (2013.01); *E21B 43/164* (2013.01)

(58) Field of Classification Search
None
See application file for complete search history.

(56) References Cited

U.S. PATENT DOCUMENTS

2014/0262265 A1* 9/2014 Hutchins ............... E21B 43/267
166/305.1
2014/0352969 A1* 12/2014 Chung ................... C09K 8/882
166/305.1
2018/0037792 A1* 2/2018 Champagne ............. C09K 8/40

* cited by examiner

*Primary Examiner* — Andrew Sue-Ako
(74) *Attorney, Agent, or Firm* — Osha Bergman Watanabe & Burton LLP (57) ABSTRACT

An aqueous wellbore fluid may include a surface active agent package in an amount ranging from 1 to 20 gpt, a thickener in an amount ranging from 0.01 to 0.3 wt. %, and an aqueous base fluid. The surface active agent package may include an α-olefin sulfonate, a terpenoid, and isopropyl alcohol. The thickener may include a biopolymer.

20 Claims, 4 Drawing Sheets

ENHANCING FOAM RHEOLOGICAL PROPERTIES USING WATER-SOLUBLE THICKENER

CROSS-REFERENCE TO RELATED APPLICATIONS

This application is a divisional of and claims the benefit of U.S. patent application Ser. No. 15/931,000, filed May 13, 2020, which is incorporated by reference in its entirety.

BACKGROUND

Enhanced oil recovery (EOR) enables the extraction of hydrocarbon reserves that conventional primary and secondary recovery processes, such as gas or water displacement, cannot access. Gas injection is one of the most widely used EOR techniques as application of an oil-miscible injection gas can greatly improve oil recovery in gas-swept zones. Despite the reported achievements of gas injection for EOR, one major challenge that still needs to be overcome to make this technique more efficient is the associated poor volumetric sweep efficiency. The key factors that contribute to this challenge are the low density and viscosity of injected gas relative to reservoir fluids, as well as reservoir features such as permeability variance.

For instance, gas injection generally provides decreased oil recovery when applied in variably-permeable wells. In such circumstances, the gas will preferentially sweep the high permeability intervals, leaving the less permeable intervals unswept and consequently not recovering a portion of the reserve. Additionally, the mobility difference between injected gas and other fluids in a formation may result in early breakthrough of gas, resulting in much of the residual oil being bypassed. This provides an increased gas to oil ratio, making the overall process less efficient.

The use of foams is one of the most promising techniques to overcome the difficulties posed by variable permeability reservoirs and improve the volumetric sweep efficiency. Foam can plug the high permeability intervals by increasing the apparent viscosity, and reducing the relative permeability, of the injected gas. Generally, foams are generated by mixing the injection gas with a surfactant-containing injection water. The injection of alternate slugs of gas and surfactant (which may also be referred to as a surface active agent) generates foam in the reservoir due to a reduction of interfacial tension at the gas-liquid interface. However, providing a foam having a sufficient long-term stability is difficult. Factors such as harsh reservoir conditions, high temperatures, salinity, rock-fluid and fluid-fluid interactions, decrease foam stability.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to aqueous wellbore fluids that include a surface active agent package, a thickener, and an aqueous base fluid. The surface active agent package may comprise an α-olefin sulfonate, a terpenoid, and isopropyl alcohol, and be contained in the wellbore fluid in an amount ranging from 1 to 20 gpt. The thickener may comprise a biopolymer and be contained in the wellbore fluid in an amount ranging from 0.01 to 0.3 wt. %.

In another aspect, embodiments disclosed herein relate to methods for recovering hydrocarbons from a hydrocarbon-containing formation The methods may include injecting into the hydrocarbon-containing formation a wellbore fluid, injecting into the hydrocarbon-containing formation a gas that mixes with the wellbore fluid, generating a foam in the formation, introducing a fluid into the hydrocarbon-containing formation, thereby displacing hydrocarbons from the hydrocarbon-containing formation, and recovering the hydrocarbons. The wellbore fluid may comprise a surface active agent package, a thickener, and an aqueous base fluid. The surface active agent package may comprise an α-olefin sulfonate, a terpenoid, and isopropyl alcohol, and be contained in the wellbore fluid in an amount ranging from 1 to 20 gpt. The thickener may comprise a biopolymer and be contained in the wellbore fluid in an amount ranging from 0.01 to 0.3 wt. %.

In another aspect, embodiments disclosed herein relate to methods of preparing an aqueous wellbore fluid that include mixing a surface active agent package, a thickener, and an aqueous base fluid. The surface active agent package may comprise an α-olefin sulfonate, a terpenoid, and isopropyl alcohol, and be contained in the wellbore fluid in an amount ranging from 1 to 20 gpt. The thickener may comprise a biopolymer and be contained in the wellbore fluid an amount ranging from 0.01 to 0.3 wt. %.

In a further aspect, embodiments disclosed herein relate to methods for enhancing the recovery of hydrocarbons from a hydrocarbon-containing formation. The methods may include injecting into the hydrocarbon-containing formation a wellbore fluid and injecting into the hydrocarbon-containing formation a gas that mixes with the wellbore fluid, generating a foam in the formation. The wellbore fluid may comprise a surface active agent package, a thickener, and an aqueous base fluid. The surface active agent package may comprise an α-olefin sulfonate, a terpenoid, and isopropyl alcohol, and be contained in the wellbore fluid in an amount ranging from 1 to 20 gpt. The thickener may comprise a biopolymer and be contained in the wellbore fluid in an amount ranging from 0.01 to 0.3 wt. %.

Other aspects and advantages of the claimed subject matter will be apparent from the following description and the appended claims.

DETAILED DESCRIPTION

Embodiments in accordance with the present disclosure generally relate to wellbore fluids that contain a surface-active agent package and a thickener, and methods of using the fluids in processes such as EOR and fracturing. Methods of one or more embodiments may involve generating foams in a hydrocarbon-containing subterranean formation. Such methods may modify the injection profile of the formation during EOR.

The formulations may be used in low-viscosity aqueous solutions that generate foams having an increased viscosity. The resulting foams demonstrate increased stability under high temperature and pressure conditions, making them highly suitable for use in downhole environments.

The wellbore fluids of one or more embodiments of the present disclosure may include, for example, water-based wellbore fluids. The wellbore fluids may be fracturing fluids or EOR fluids, among others.

Water-based wellbore fluids of one or more embodiments may have an aqueous base fluid. The aqueous fluid may include at least one of fresh water, seawater, brine, water-soluble organic compounds, and mixtures thereof. The aqueous fluid may contain fresh water formulated to contain various salts in addition to the first or second salt, to the extent that such salts do not impede the desired nitrogen-generating reaction. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In particular embodiments, brine may include an alkali metal halide or carboxylate salt and/or alkaline earth metal carboxylate salts.

The wellbore fluids of one or more embodiments may include a surface active agent package, which contains a surface active agent (or surfactant). In some embodiments, the surface active agent package may include one or more of a terpenoid, an anionic surfactant, and a polar carrier. In some embodiments, the surface active agent may comprise all three of a terpenoid, an anionic surfactant, and a polar carrier. In particular embodiments, the surface active agent may consist essentially of, and in some embodiments consist of, a terpenoid, an anionic surfactant, and a polar carrier.

The wellbore fluids of one or more embodiments may comprise the surface active agent in an amount of the range of about 0.5 to 25 gallons per thousand gallons (gpt). For example, the wellbore fluid may contain the surface active agent in an amount ranging from a lower limit of any of 0.5, 1, 2, 3, 5, 7, 10, and 12 gpt to an upper limit of any of 2, 4, 5, 8, 10, 15, 20, and 25 gpt, where any lower limit can be used in combination with any mathematically-compatible upper limit.

The surface active agent of one or more embodiments may include one or more terpenoids. In some embodiments, the one or more terpenoids may be selected from a monoterpene, a diterpene, a triterpene, and a sesquiterpene. In some embodiments, the terpenoid may be one or more of d-limonene, α-pinene, B-pinene, myrecene, geraniol, carvone, crysanthemic acid, farnesol, humulene, squalene, careen, camphene, C-terpinene, Y-terpinene, and Sabinene. In particular embodiments, the terpenoid may be citrus terpenes and comprise d-limonene. In some embodiments, the citrus terpenes may comprise d-limonene in an amount of 90% by weight (wt. %) or more, 92 wt. % or more, 94 wt. % or more, 95 wt. % or more, 97 wt. % or more, 99 wt. % or more, 99.5 wt. % or more, or approximately 100 wt. %.

In one or more embodiments, the surface active agent may comprise the terpenoid in an amount of the range of about 1 to 30% by weight (wt. %), relative to a total weight of the surface active agent package. For example, the surface active agent package may contain the terpenoid in an amount ranging from a lower limit of any of 1, 2, 5, 10, 15, and 20 wt. % to an upper limit of any of 3, 5, 10, 15, 20, 25, and 30 wt. %, where any lower limit can be used in combination with any mathematically-compatible upper limit.

The surface active agent package of one or more embodiments may include one or more anionic surfactants. As used herein, anionic surfactants are categorized as anionic if they possess groups having a negative charge or no charge unless the pH is elevated to neutrality or above (e.g. carboxylic acids). In one or more embodiments, one or more of carboxylate, sulfonate, sulfate and phosphate groups may be the polar (hydrophilic) solubilizing groups found in anionic surfactants. The anionic surfactants of one or more embodiments may include a monovalent or divalent cation. Examples thereof may include alkali metals such as sodium, lithium and potassium, which may impart improved water solubility; ammonium and substituted ammonium ions, which may provide both water and oil solubility; and alkaline earth metals such as calcium, barium, and magnesium, which may promote oil solubility.

The anionic surfactants of one or more embodiments may be selected from one or more of acylamino acids (and salts), such as acylgluamates, acyl peptides, sarcosinates, taurates, and the like, carboxylic acids (and salts), such as alkanoic acids (and alkanoates), ester carboxylic acids, ether carboxylic acids, and the like, sulfonic acids (and salts), such as isethionates, alkylaryl sulfonates, alkyl sulfonates, sulfosuccinates, and the like, and sulfuric acid esters (and salts), such as alkyl ether sulfates, alkyl sulfates, and the like.

Particular anionic surfactants of one or more embodiments may include α-olefin sulfonates, such as long chain alkene sulfonates, long chain hydroxyalkane sulfonates or mixtures of alkenesulfonates and hydroxyalkane-sulfonates. Other examples of the anionic surfactants of one or more embodiments may include alkyl sulfates, alkyl poly(ethyleneoxy)ether sulfates and aromatic poly(ethyleneoxy)sulfates, and the ammonium, substituted ammonium, and/or alkali metal salts of the alkyl mononuclear aromatics such as alkylbenzene sulfonates. For instance, salts of alkylbenzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

In one or more embodiments, the surface active agent package may comprise the anionic surfactant in an amount of the range of about 1 to 40 wt. %, relative to a total weight of the surface active agent package. For example, the surface active agent package may contain the anionic surfactant in an amount ranging from a lower limit of any of 1, 5, 10, 15, 20, 35, and 30 wt. % to an upper limit of any of 5, 10, 15, 20, 25, 30, 35, and 40 wt. %, where any lower limit can be used in combination with any mathematically-compatible upper limit.

The surface active agent package of one or more embodiments may include one or more polar carrier such as water, alcohols, other polar solvents, or mixtures thereof. In particular embodiments, the polar carrier may be a low molecular weight primary, secondary, or tertiary alcohol. In some embodiments, the alcohol may be one or more selected from the group consisting of methanol, ethanol, propanol, isopropanol, butanol, isobutanol, and tertbutanol.

In one or more embodiments, the surface active agent package may comprise the polar carrier in an amount of the range of about 1 to 40 wt. %, relative to a total weight of the surface active agent package. For example, the surface active agent package may contain the polar carrier in an amount ranging from a lower limit of any of 1, 5, 10, 15, 20, 35, and 30 wt. % to an upper limit of any of 5, 10, 15, 20, 25, 30, 35, and 40 wt. %, where any lower limit can be used in combination with any mathematically-compatible upper limit.

In one or more embodiments the surface active package may further comprise an additional aqueous solvent, which may be selected from the group consisting of fresh water, seawater, brine, water-soluble organic compounds, and mixtures thereof. In some embodiments, the surface active package may consist essentially of a terpenoid, an anionic surfactant, and a polar carrier. In some embodiments, the surface active package may consist of a terpenoid, an anionic surfactant, and a polar carrier. In some embodiments, the surface active package may consist essentially of a terpenoid, an anionic surfactant, a polar carrier, and an additional aqueous solvent. In some embodiments, the surface active package may consist of a terpenoid, an anionic surfactant, a polar carrier, and an additional aqueous solvent.

In one or more embodiments, the surface active agent package may comprise the terpenoid and the anionic surfactant in a weight ratio of 3:1 to 1:4, by weight, where the weight ratio is given as the weight of the terpenoid to the weight of the anionic surfactant. For example, the surface active agent package may contain the terpenoid and the anionic surfactant in a weight ratio of ranging from a lower limit of any of 3:1, 2:1, 1:1, and 1:2 to an upper limit of any of 1:1. 1:2, 1:3, and 1:4, where any lower limit can be used in combination with any mathematically-compatible upper limit.

In one or more embodiments, the surface active agent package may comprise the terpenoid and the polar carrier in a weight ratio of 3:1 to 1:4, by weight, where the weight ratio is given as the weight of the terpenoid to the weight of the polar carrier. For example, the surface active agent package may contain the terpenoid and the polar carrier in a weight ratio of ranging from a lower limit of any of 3:1, 2:1, 1:1, and 1:2 to an upper limit of any of 1:1. 1:2, 1:3, and 1:4, where any lower limit can be used in combination with any mathematically-compatible upper limit.

In one or more embodiments, the surface active agent package may comprise the anionic surfactant and the polar carrier in a weight ratio of 4:1 to 1:4, by weight, where the weight ratio is given as the weight of the anionic surfactant to the weight of the polar carrier. For example, the surface active agent package may contain the anionic surfactant and the polar carrier in a weight ratio of ranging from a lower limit of any of 4:1, 3:1, 2:1, 1:1, and 1:2 to an upper limit of any of 2:1. 1:1. 1:2, 1:3, and 1:4, where any lower limit can be used in combination with any mathematically-compatible upper limit.

The wellbore fluids of one or more embodiments may include one or more thickeners, in combination with the surface active agent package. In one or more embodiments, the thickeners may comprise a hydrophilic part, for instance, a water-soluble polymer chain. The water-soluble chain may be one or more selected from the group consisting of polyethylene glycol, cellulose derivatives, acrylate chains, polyether chains, and polyester chains. The thickeners may further comprise one or more hydrophobic groups. The hydrophilic and hydrophobic groups may be bonded by, for example, urethane bonds, ester bonds, ether bonds, urea bonds, carbonate bonds or amide bonds.

In one or more embodiments, the thickener may be one or more of a polyacrylamide and a polysaccharide. In particular embodiments, the thickener may be one or more of hydroxyethylcellulose, carboxymethylhydroxyethylcellulose, xanthan gum, hydrolyzed polyacrylamide, acrylamide-containing copolymers, polyacrylamide, polyacrylic acid, glucan, dextran polyethyleneoxide, and polyvinyl alcohol.

The wellbore fluid of one or more embodiments may comprise the thickener in an amount of the range of about 0.01 to 5.0 wt. %. For example, the wellbore fluid may contain the thickener in an amount ranging from a lower limit of any of 0.01, 0.05, 0.1, 0.15, 0.2, 0.25, 0.3, 0.5, 1.0, 1.5, and 2.5 wt. % to an upper limit of any of 0.1, 0.2, 0.3, 0.4, 0.5, 1.0, 2.0, 3.0, 3.5, 4.0, and 5.0 wt. %, where any lower limit can be used in combination with any mathematically-compatible upper limit.

In one or more embodiments, the wellbore fluids have a density that is greater than 1.00 g/cm$^3$. For example, the wellbore fluids may have a density that is of an amount ranging from a lower limit of any of 1.00, 1.05, 1.10, 1.15, and 1.20 g/cm$^3$ to an upper limit of any of 1.05, 1.10, 1.15, 1.20, and 1.25 g/cm$^3$, where any lower limit can be used in combination with any mathematically-compatible upper limit.

In one or more embodiments, the wellbore fluids may have a viscosity at 25° C. that is of the range of about 12 to 40 cP. For example, the wellbore fluids may have a viscosity at 25° C. that is of an amount ranging from a lower limit of any of 12, 14, 16, 18, 20, 22, 25, and 30 cP to an upper limit of any of 20, 22, 24, 26, 28, 30, 35 and 40 cP, where any lower limit can be used in combination with any mathematically-compatible upper limit. In some embodiments, the wellbore fluids may have a viscosity at 25° C. of 40 cP or less, 30 cP or less, cP or less, or 20 cP or less.

In one or more embodiments, the wellbore fluids may have a viscosity at 50° C. that is of the range of about 4 to 20 cP. For example, the wellbore fluids may have a viscosity at 50° C. that is of an amount ranging from a lower limit of any of 4, 6, 8, 10, 12, and 14 cP to an upper limit of any of 10, 12, 14, 16, 18, and 20 cP, where any lower limit can be used in combination with any mathematically-compatible upper limit. In some embodiments, the wellbore fluids may have a viscosity at 50° C. of 20 cP or less, 16 cP or less, 14 cP or less, 12 cP or less, or 10 cP or less.

Methods in accordance with the present disclosure may comprise the injection of a wellbore fluid into a formation. In addition to the injection of the wellbore fluid, methods in accordance with one or more embodiments further comprise the injection of a gas. The gas will, in some embodiments, be co-injected with the wellbore fluids. In some embodiments, the gas may be injected after the wellbore fluid. The gas may be one or more of carbon dioxide, nitrogen, and methane. The carbon dioxide of one or more embodiments may be injected as supercritical carbon dioxide. When the gas contacts the surface active agent package, a foam may be generated. In some embodiments, the use of nitrogen gas may provide a more stable foam than carbon dioxide. This is because, the dissolution of carbon dioxide in the wellbore fluid may result in a pH decrease and/or temperature increase, as discussed above, decreasing the stability of the foam.

One of ordinary skill in the art will appreciate, with the benefit of this disclosure, that the injected gas needs to have a pressure that is greater than that of the formation into which it is being injected. In some embodiments, the pressure of the gas may be of a range having a lower limit of any of 1250, 1500, 1750, 2000, and 2500 psi to an upper limit of any of 1500, 1750, 2000, 2250, 2500, and 3000 psi.

In one or more embodiments, the gas may be co-injected at a quality in the range of 10 to 95%. The term "quality" is used herein to describe the volumetric flow of gas relative to the total volumetric flow in the co-injection process. In some embodiments, the quality of the gas may be of a range having a lower limit of any of 10, 15, 20, 25, 30, 40, and 50% to an upper limit of any of 40, 50, 60, 70, 80, and 95%, where any lower limit can be used in combination with any mathematically-compatible upper limit. In one or more embodiments, the quality of gas may be dependent upon the composition of the wellbore fluid used. In one or more embodiments, the selected quality of gas may be dependent upon the composition of the surface active agent package that is used.

In one or more embodiments, the generated foam may be more viscous than the injected wellbore fluid and gas. The foam may, therefore, be suitable for plugging the more permeable regions of the formation.

In one or more embodiments, the generated foam may have a viscosity at 50° C. that is of the range of about 15 to 200 cP. For example, the generated foam may have a viscosity at 50° C. that is of an amount ranging from a lower limit of any of 15, 17, 20, 25, 30, 40, 50, 60, 70, 80, and 100 cP to an upper limit of any of 50, 60, 70, 80, 90, 100, 120, 140, 160, 180, and 200 cP, where any lower limit can be used in combination with any mathematically-compatible upper limit.

In one or more embodiments, the generated foam may have a viscosity at 100° C. that is of the range of about 10 to 140 cP. For example, the generated foam may have a viscosity at 100° C. that is of an amount ranging from a lower limit of any of 10, 12, 15, 17, 20, 25, 30, 40, 50, and 60 cP to an upper limit of any of 20, 30, 40, 50, 60, 80, 100, 120, and 140 cP, where any lower limit can be used in combination with any mathematically-compatible upper limit.

In one or more embodiments, the generated foam may have a viscosity that is 1.1 to 10 times that of the wellbore fluid before foaming. For example, the foam may have a viscosity that is of an amount ranging from a lower limit of any of 1.1, 1.25, 1.5, 2, 2.5, 3, and 5 to an upper limit of any of 1.5, 2, 3, 4, 5, 7, and 10 times greater than that of the wellbore fluid before foaming, where any lower limit can be used in combination with any mathematically-compatible upper limit.

The generated foam of one or more embodiments may have a quality (as defined above) ranging from about 50 to 99%. In some embodiments, the quality of the foam may be of a range having a lower limit of any of 50, 60, 70, 80, 90, and 95% to an upper limit of any of 55, 65, 75, 85, 95, and 99%, where any lower limit can be used in combination with any mathematically-compatible upper limit. The quality of the foam of one or more embodiments may be dependent upon both the quality of the gas and the composition of the surface active agent package.

The solutions have a low viscosity and, therefore, good injectivity, while the resulting foams are stable enough for use downhole. These foams can reduce gas mobility by increasing the apparent viscosity and decreasing the permeability of the gas, resulting in improved sweep efficiency by diverting the flow from high permeability zones to lower ones and, ultimately, providing improved oil recovery.

The methods of one or more embodiments of the present disclosure may further comprise a pre-flushing step before the injection of the wellbore fluid. The pre-flushing step may comprise flushing the formation with a flushing solution that comprises a surface active agent package. The flushing solution may be an aqueous solution, and the surface active agent package may be the same surface active agent package as included in the wellbore fluid. The pre-flushing may limit the adsorption of the surface active agent package on the rock surface of the formation during the injection process. In some embodiments, the pre-flushing may provide a stronger foam. The suitability of the use of a pre-flushing step may depend on the type of surface active agent and rock.

The hydrocarbon-containing formation of one or more embodiments may be a formation containing multiple zones of varying permeability. For instance, the formation may contain at least a zone having a relatively higher permeability and a zone having a relatively lower permeability. During conventional injection, fluids and gases preferentially sweep the higher permeability zone, leaving the lower permeability zone incompletely swept. In one or more embodiments, the generated nitrogen foam may plug the higher permeability zone, allowing subsequent fluid to sweep the low permeability zone and improving sweep efficiency.

In one or more embodiments, the formation may have a temperature ranging from about 80 to 250° C. For example, the formation may have a temperature that is of an amount ranging from a lower limit of any of 80, 90, 100, 120, 140, 160, 180, and 200° C. to an upper limit of any of 100, 120, 140, 160, 180, 200, 225, and 250° C., where any lower limit can be used in combination with any mathematically-compatible upper limit.

Figure 1:
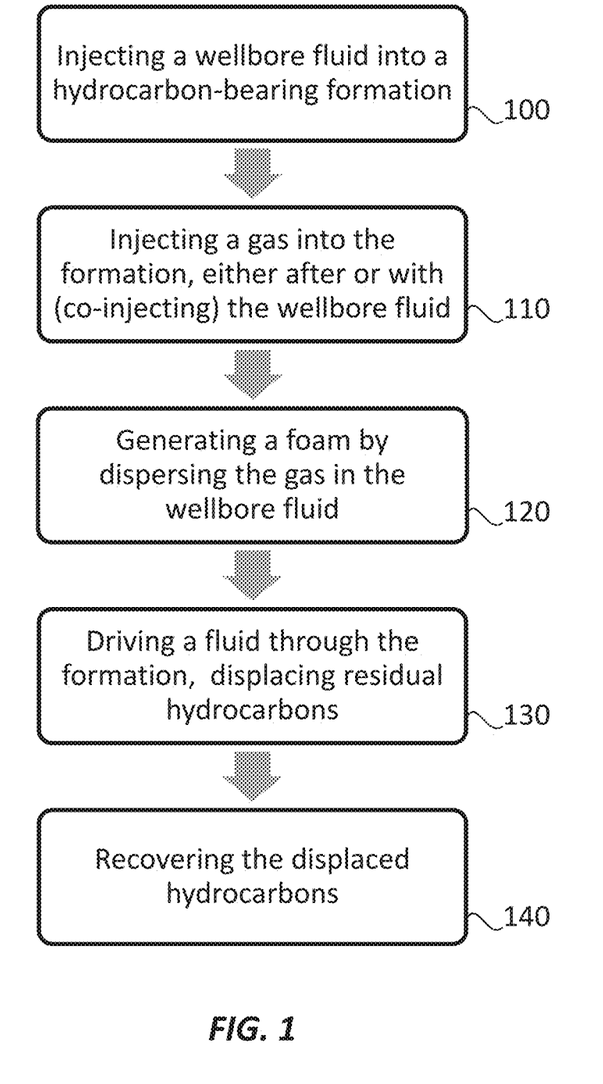
FIG. 1 is a flowchart depicting an enhanced oil recovery (EOR) process in accordance with one or more embodiments of the present disclosure.

The methods of one or more embodiments may be used for enhanced oil recovery (EOR) operations. An EOR process in accordance with one or more embodiments of the present disclosure is depicted by, and discussed with reference to, FIG. 1. Specifically, in step 100, the wellbore fluid may be injected into a hydrocarbon-bearing formation at an injection well. In step 110, a gas may be co-injected with the wellbore fluid or injected after the wellbore fluid. The gas may be dispersed in the wellbore fluid in step 120, generating a foam. In step 130, after foam generation, a fluid may be driven through the mobile zone of the formation, displacing hydrocarbons. As the foam may plug the more permeable zones of the formation, the fluid may preferentially displace hydrocarbons from lower permeability zones. In one or more embodiments, the hydrocarbon-displacing fluid may be a gas that is either the same as, or different from, the gas used to generate the foam. In step 140, the displaced hydrocarbons may be recovered. In one or more embodiments, the hydrocarbons may be recovered at a production well. In one or more embodiments, the hydrocarbon-displacing fluid may be introduced into the reservoir through a wellbore or other protrusion, drill hole, or opening. In some embodiments, the fluid may be introduced at a location different from the wellbore in which the wellbore fluid is introduced. The fluid may be introduced at an elevated pressure sufficient to ensure substantial infiltration of the fluid into the fracture network of the formation and substantial exposure of the porous matrix of the formation. The hydrocarbons that are displaced may be recovered at the same or a different location than the location of the introduction of the fluid.

In one or more embodiments, the EOR process may be repeated one or more times to increase the amount of hydrocarbons recovered. In some embodiments, subsequent EOR processes may involve the use of different amounts of the surface active agent packages and/or different surface active agent packages than the first. The methods of one or more embodiments may advantageously provide improved sweep efficiency.

The methods of one or more embodiments may be used for fracturing a formation. In these embodiments, the wellbore fluid may be injected into a hydrocarbon-bearing formation at an injection well. A gas may be co-injected with the wellbore fluid to provide a foam. The foam may be driven through the formation at a pressure higher than the formation, opening pores and cracks present in the formation. The wellbore fluid of one or more embodiments may contain a proppant, such as sand, that can keep the pores and cracks of the formation open. These processes may, therefore, increase the permeability and hydrocarbon flow of the formation.

In one or more embodiments, a foam generated in a method of fracturing may be more viscous than a foam generated in an EOR method. Therefore, a method of fracturing may include the use of a wellbore fluid that contains a larger amount of thickener than a method of EOR.

EXAMPLES

The following examples are merely illustrative and should not be interpreted as limiting the scope of the present disclosure.

Solutions containing only a surface active agent package and other solutions containing both the surface active agent package and a thickener (hydroxyethylcellulose) were prepared in deionized water. The surface active agent package comprised isopropanol, citrus terpenes and α-olefin sulfonate. Foam rheological properties were measured using a foam rheometer device. The gas used for foam generation was $CO_2$ with 99.5% purity. Experiments were conducted under a $CO_2$ pressure of 1500 psi and at two different temperatures: 50° C. and 100° C. The surface active agent package was included in concentrations of 5 gpt and 10 gpt. The thickener concentration was fixed at 0.20 wt. %.

Figure 2:
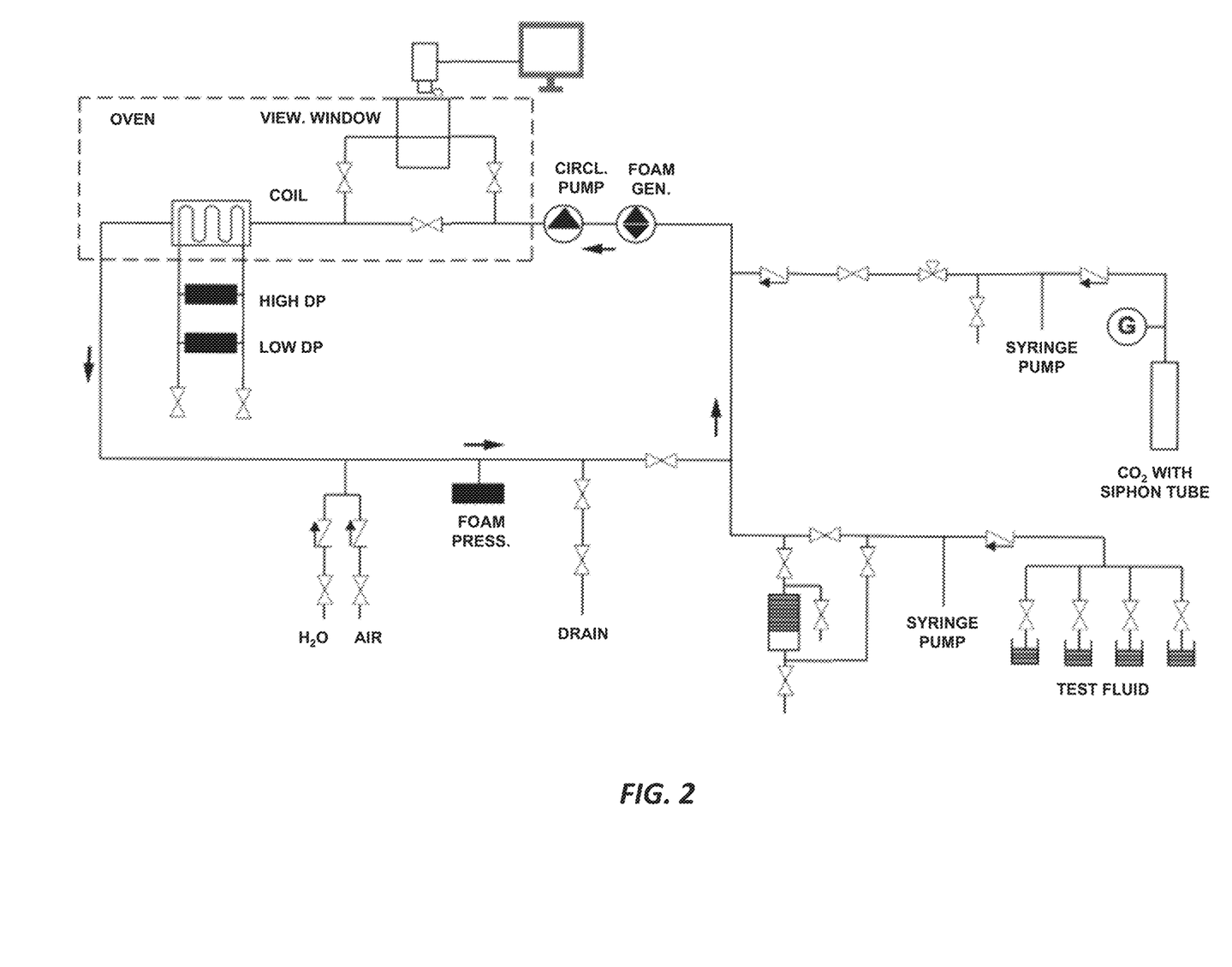
FIG. 2 is a schematic representation of a foam rheometer apparatus.

The foam rheology measurements provide an assessment of the ability of surfactant, and the combination of the surfactant and a thickener, to increase the apparent viscosity as a result of foam generation. Measured volumes of an as-supplied surfactant stock solution were directly dissolved in deionized water to prepare 5 gpt and 10 gpt active surfactant solutions and mixtures of the same solutions with 0.20 wt. % thickener. Rheology experimentations were conducted on a custom made HPHT foam loop rheometer. A schematic of the apparatus is shown in FIG. 2.

Foam studies were performed with sc-$CO_2$ under high pressure (1500 psi), and high temperature (50° C. and 100° C.). The applied shear rates ranged from 10-600 s' and 70% quality (volume of sc-$CO_2$ to total volume of injected fluids) was used. The procedure involved allowing the foaming agent package (surfactant/mixture of surfactant and thickener in deionized water) to equilibrate in the foam loop. The sc-$CO_2$ was then injected into the system and enough time was given for mixing at low shear rate until temperature and pressure stabilized. The mixture was circulated in the foam loop and visualized through the viewing cell to ensure that foam was formed. Apparent viscosities ($\mu_{apparent}$) were then measured at different shear rates ($\gamma$) using the below equations.

$$\mu_{apparent} = \frac{\tau}{\gamma} \quad (1)$$

$$\tau = \frac{D \Delta P}{4L} \quad (2)$$

$$\gamma = \frac{8V}{D} \quad (3)$$

where $\tau$ is the shear stress, D is the tube diameter, $\Delta P$ is the differential pressure across the foam loop, L is the tube length and V is the velocity.

First, the viscosities of the solutions, surfactant and the mixture of surfactant and thickener, were measured at 25° C. and 50° C. to ensure that the viscosities of solutions are very close to that of water and also to provide a baseline for the increase of foam viscosity when the surfactant and mixture are used to increase the sc-$CO_2$ viscosity. The results of are summarized in Table 1.

TABLE 1

Viscosity of solutions at 25° C. and 50° C., shear rate of 6.8 s$^{-1}$

| Solution | Viscosity at 25° C. (cP) | Viscosity at 50° C. (cP) |
| --- | --- | --- |
| Deionized Water | 0.890 | 0.546 |
| 10 gpt surfactant | 0.900 | 0.550 |
| 5 gpt surfactant + 0.20 wt % thickener | 22.100 | 11.200 |

Figure 3:
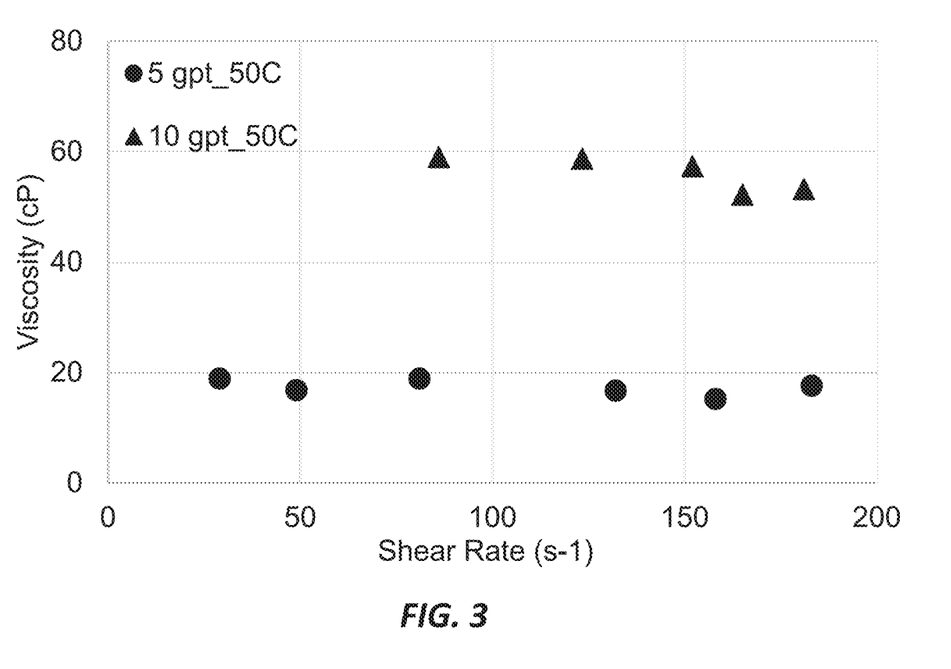
FIG. 3 is a graph showing foam viscosity versus shear rate for two wellbore fluids of one or more embodiments of the present disclosure.

The foam rheological properties were measured at the conditions stated above. The increase of surfactant concentration enhances the foam viscosity. FIG. 3 shows the effect of surfactant concentration on foam viscosity at 50° C. and 100° C. The addition of the thickener to the surfactant solution was able to increase the viscosity of the foam and, accordingly, increasing the foam stability.

Figure 4:
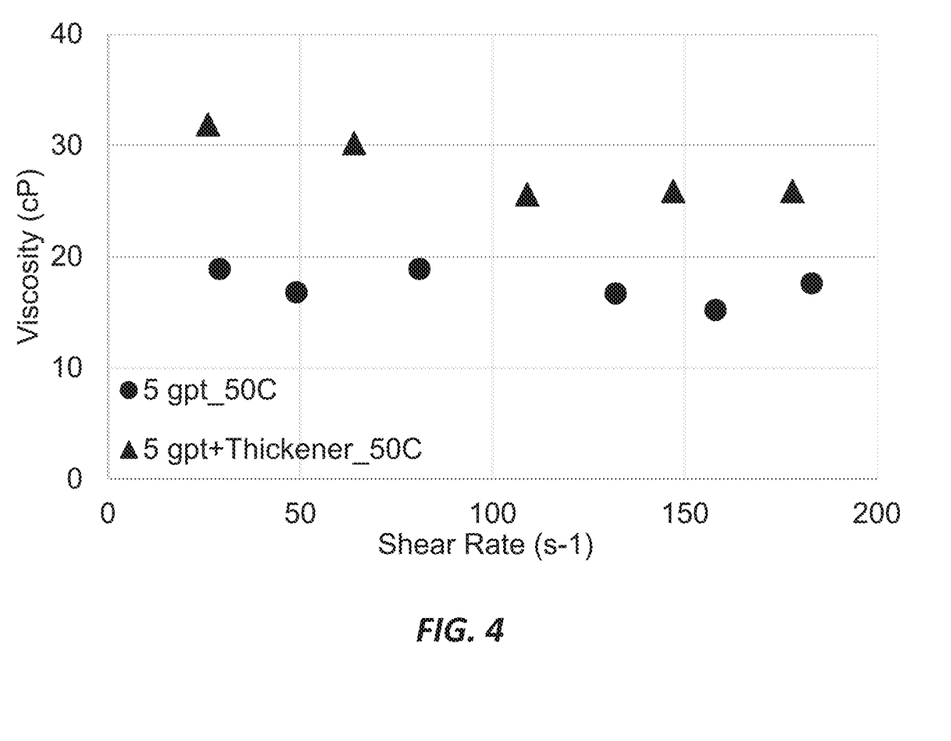
FIG. 4 is a graph showing foam viscosity versus shear rate for two wellbore fluids of one or more embodiments of the present disclosure.
Figure 5:
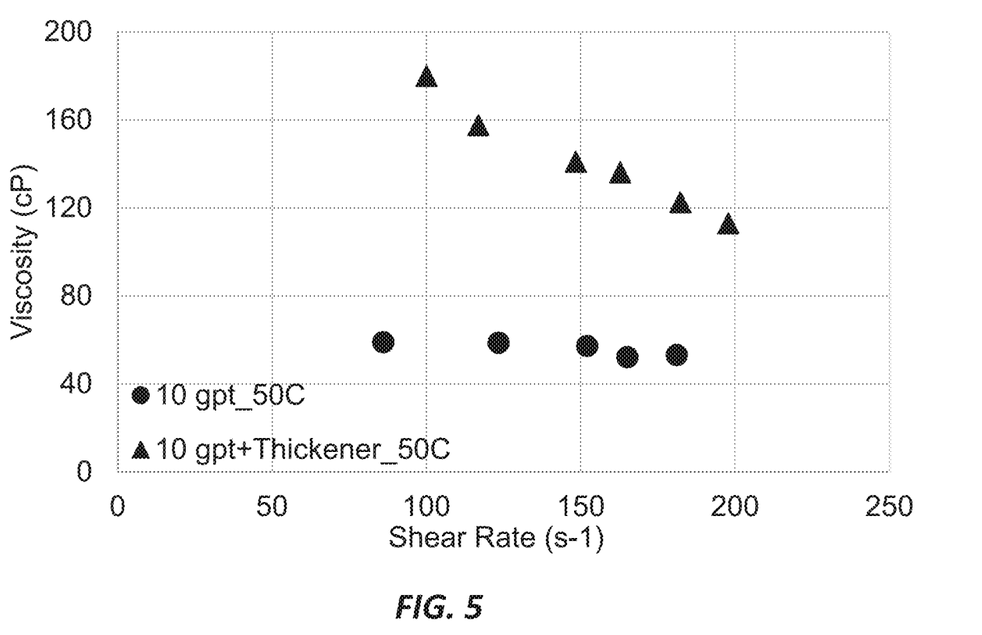
FIG. 5 is a graph showing foam viscosity versus shear rate for two wellbore fluids of one or more embodiments of the present disclosure.
Figure 6:
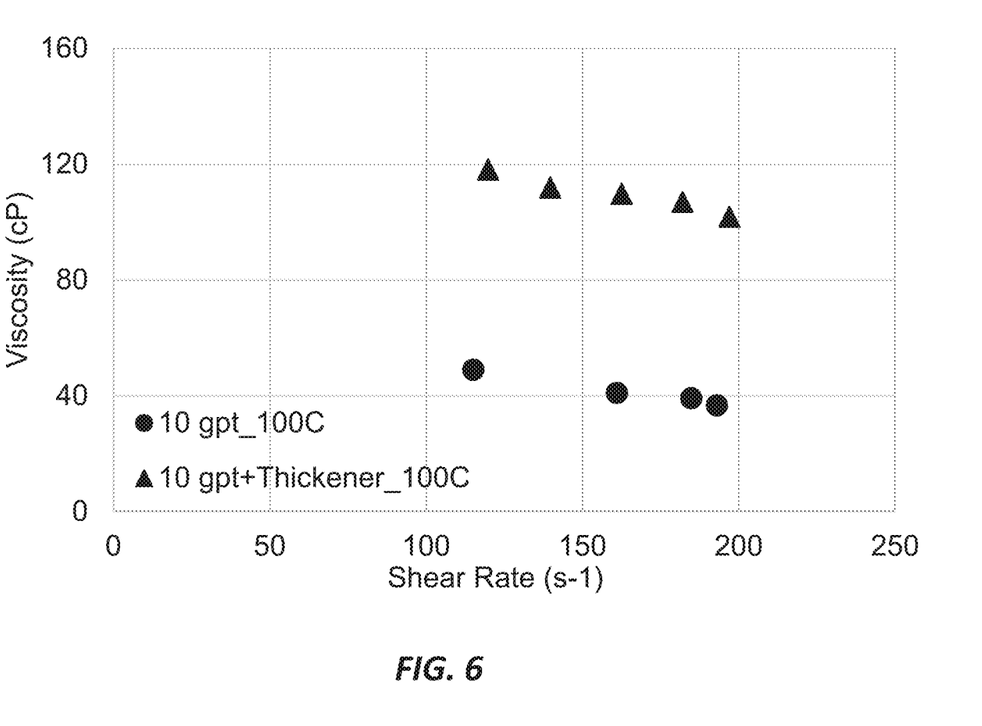
FIG. 6 is a graph showing foam viscosity versus shear rate for two wellbore fluids of one or more embodiments of the present disclosure.

The foam viscosity using only 5 gpt of the surfactant and the mixture of 5 gpt of surfactant and 0.20 wt. % of thickener are shown in FIG. 4. The addition of 0.20 wt. % of the thickener is shown to increase the foam viscosity from around 20 cP to 30 cP. Also, FIGS. 5 and 6 show the foam viscosity using 10 gpt and the surfactant and the mixture of 10 gpt of surfactant and 0.20 wt. % of thickener at 50° C. and 100° C., respectively. At 50° C., the addition of the thickener produced foam with a higher viscosity than that of the surfactant alone. The foam viscosity of the mixture was three times of the surfactant. This clearly reflects the role of the thickener on enhancing the foam viscosity and, eventually, the stability at conditions similar to reservoir conditions. At 100° C., as shown in FIG. 6, the addition of 0.20 wt. % of the thickener to a 10 gpt surfactant solution generated foam with twice the viscosity of that using the surfactant alone. This demonstrates the effectiveness of the wellbore fluids of one or more embodiments on enhancing the foam viscosity and stability, which are very important for the success of the foam deployment in the field.

Although the preceding description has been described with reference to particular means, materials, and embodiments, it is not intended to be limited to the particulars disclosed; rather, it extends to all functionally equivalent structures, methods and uses, such as are within the scope of the appended claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed is:

1. A method for recovering hydrocarbons from a hydrocarbon-containing formation, the method comprising:
    injecting into the hydrocarbon-containing formation a wellbore fluid that comprises a surface active agent package, a thickener, and an aqueous base fluid, wherein the surface active agent package comprises an α-olefin sulfonate, a terpenoid, and isopropyl alcohol, and wherein the wellbore fluid comprises the surface active agent package in an amount in the range of 1 to 20 gallons per thousand gallons (gpt) and the thickener in an amount in the range of 0.01 to 0.3 wt. %;
    injecting into the hydrocarbon-containing formation a gas that mixes with the wellbore fluid, generating a foam in the formation,
        wherein the generated foam has a viscosity at 50° C. of 80 to 200 cP and at 100° C. of 60 to 140 cP;
    introducing a fluid into the hydrocarbon-containing formation, thereby displacing hydrocarbons from the hydrocarbon-containing formation; and
    recovering the hydrocarbons.

2. The method of claim 1, wherein the wellbore fluid and the gas are co-injected.

3. The method of claim 1, wherein the gas is injected after the wellbore fluid.

4. The method of claim 1, wherein the hydrocarbon-containing formation comprises a zone of high permeability and a zone of low permeability.

5. The method of claim 1, wherein the generated foam has a viscosity that is 1.1 to 10 times that of the wellbore fluid before foaming.

6. The method of claim 1, wherein the surface active agent package comprises the α-olefin sulfonate in an amount in the range of 20 to 30 wt. %.

7. The method of claim 1, wherein the surface active agent package comprises the isopropyl alcohol in an amount in the range of 20 to 30 wt. %.

8. The method of claim 1, wherein the surface active agent package comprises the terpenoid in an amount in the range of 10 to 20 wt. %.

9. The method of claim 1, wherein the thickener is hydroxyethylcellulose.

10. The method of claim 1, wherein the terpenoid is citrus terpenes.

11. A method for enhancing the recovery of hydrocarbons from a hydrocarbon-containing formation, the method comprising:
    injecting into the hydrocarbon-containing formation a wellbore fluid that comprises a surface active agent package, a thickener, and an aqueous base fluid, wherein the surface active agent package comprises an α-olefin sulfonate, a terpenoid, and isopropyl alcohol, and wherein the wellbore fluid comprises the surface active agent package in an amount in the range of 1 to 20 gallons per thousand gallons (gpt) and the thickener in an amount in the range of 0.01 to 0.3 wt. %; and
    injecting into the hydrocarbon-containing formation a gas that mixes with the wellbore fluid, generating a foam in the formation,
        wherein the generated foam has a viscosity at 50° C. of 80 to 200 cP and at 100° C. of 60 to 140 cP.

12. The method of claim 11, wherein the wellbore fluid and the gas are co-injected.

13. The method of claim 11, wherein the gas is injected after the wellbore fluid.

14. The method of claim 11, wherein the hydrocarbon-containing formation comprises a zone of high permeability and a zone of low permeability.

15. The method of claim 11, wherein the generated foam has a viscosity that is 1.1 to 10 times that of the wellbore fluid before foaming.

16. The method of claim 11, wherein the surface active agent package comprises the α-olefin sulfonate in an amount in the range of 20 to 30 wt. %.

17. The method of claim 11, wherein the surface active agent package comprises the isopropyl alcohol in an amount in the range of 20 to 30 wt. %.

18. The method of claim 11, wherein the surface active agent package comprises the terpenoid in an amount in the range of 10 to 20 wt. %.

19. The method of claim 11, wherein the thickener is hydroxyethylcellulose.

20. The method of claim 11, wherein the terpenoid is citrus terpenes.

* * * * *